(12) United States Patent
Suzuki

(10) Patent No.: US 8,745,229 B2
(45) Date of Patent: Jun. 3, 2014

(54) COMMUNICATION SYSTEM, COMMUNICATION APPARATUS, AND DISPLAY METHOD FOR THE SAME

(75) Inventor: Noriyuki Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/097,735

(22) PCT Filed: Jan. 17, 2007

(86) PCT No.: PCT/JP2007/051019
§ 371 (c)(1),
(2), (4) Date: Jun. 16, 2008

(87) PCT Pub. No.: WO2007/088753
PCT Pub. Date: Aug. 9, 2007

(65) Prior Publication Data
US 2009/0265457 A1    Oct. 22, 2009

(30) Foreign Application Priority Data
Jan. 31, 2006 (JP) .................. 2006-023622

(51) Int. Cl.
G06F 15/16 (2006.01)
G06F 15/173 (2006.01)
H04L 12/56 (2006.01)
H04L 12/28 (2006.01)

(52) U.S. Cl.
CPC ............. *H04L 45/22* (2013.01); *H04L 12/2809* (2013.01)
USPC .......................................... 709/226; 709/239

(58) Field of Classification Search
CPC ....................... H04L 45/22; H04L 12/2809
USPC ......... 709/217–219, 223, 224, 226, 239, 250; 379/201.07; 370/527; 455/436, 566, 455/436.566
See application file for complete search history.

(56) References Cited

U.S. PATENT DOCUMENTS

| | | | |
|---|---|---|---|
| 5,504,757 A * | 4/1996 | Cook et al. | 370/468 |
| 6,012,088 A * | 1/2000 | Li et al. | 709/219 |
| 6,067,568 A * | 5/2000 | Li et al. | 709/223 |

(Continued)

FOREIGN PATENT DOCUMENTS

| | | | |
|---|---|---|---|
| JP | 2000-305885 A | 11/2000 | |
| JP | 2002-135199 A | 5/2002 | |

(Continued)

OTHER PUBLICATIONS

Shirehjini, A., "A generic UPnP architecture for ambient intelligence meeting rooms and a control point allowing for integrated 2D and 3D interaction", ACM International Conference Proceeding Series; vol. 121, 2005. [retrieved from ACM databse on Aug. 27, 2010].*

(Continued)

*Primary Examiner* — Michael Chao
(74) *Attorney, Agent, or Firm* — Canon USA, Inc., IP Division

(57) ABSTRACT

The device configuration of a communication system capable of wireless data communication between a plurality of terminal apparatuses is confirmed, together with the operating condition of each of the terminal apparatuses and the channel condition of wireless data communication. Whether a service that can be provided as a communication system is executable is identifiably displayed on a display based on the confirmation results.

13 Claims, 21 Drawing Sheets

| SERVICE CONTENT | SERVICE EXECUTABILITY | DATA TRANSFER | |
|---|---|---|---|
| WATCH TV PROGRAM(HD IMAGES) | NONEXECUTABLE (TUNER OPERATING) | | |
| WATCH TV PROGRAM(SD IMAGES) | NONEXECUTABLE (TUNER OPERATING) | | |
| RECORD TV PROGRAM(HD IMAGES) | NONEXECUTABLE (TUNER, RECORDER OPERATING) | | |
| RECORD TV PROGRAM(SD IMAGES) | NONEXECUTABLE (TUNER, RECORDER OPERATING) | | |
| WATCH CAMERA VIDEO(HD IMAGES) | NONEXECUTABLE (UNABLE TO SECURE COMMUNICATION BAND) | DLS | TRY CHANGING INSTALLATION LOCATION |
| WATCH CAMERA VIDEO(SD IMAGES) | EXECUTABLE | AP | |
| RECORD CAMERA VIDEO(HD IMAGES) | NONEXECUTABLE (RECORDER OPERATING) | | |
| RECORD CAMERA VIDEO(SD IMAGES) | EXECUTABLE | AP | |
| PLAY RECORDED VIDEO(HD IMAGES) | NONEXECUTABLE (RECORDER OPERATING) | | |
| PLAY RECORDED VIDEO(SD IMAGES) | EXECUTABLE | DLS | |

(56) References Cited

U.S. PATENT DOCUMENTS

| | | | |
|---|---|---|---|
| 6,269,395 | B1* | 7/2001 | Blatherwick et al. ......... 709/219 |
| 7,522,549 | B2* | 4/2009 | Karaoguz et al. ............. 370/312 |
| 2003/0005078 | A1* | 1/2003 | Turicchi et al. ............... 709/217 |
| 2004/0103184 | A1* | 5/2004 | Humpleman et al. ........ 709/223 |
| 2004/0174853 | A1* | 9/2004 | Saito et al. .................... 370/338 |
| 2005/0198344 | A1 | 9/2005 | Fujita |
| 2005/0265295 | A1 | 12/2005 | Ishizuka |
| 2006/0256772 | A1* | 11/2006 | Yarlagadda ................... 370/352 |
| 2007/0104138 | A1* | 5/2007 | Rudolf et al. ................. 370/329 |

FOREIGN PATENT DOCUMENTS

| | | |
|---|---|---|
| JP | 2004-153558 A | 5/2004 |
| JP | 2005-217975 A | 8/2005 |
| JP | 2005-341232 A | 12/2005 |

OTHER PUBLICATIONS

Haber, A., Reichert, F., Fasbender, A., "UPnP Control Point for Mobile Phones in Residential Networks", in 15th IST Mobile & Wireless Communication Summit, Myconos, Greece, 2006. [retrieved from Internet on Aug. 27, 2010].*

Bhagwat, P., "Bluetooth: technology for short-range wireless apps", Internet Computing, IEEE; May/Jun. 2001, vol. 5, Issue 3; pp. 96-103 [retrieved from IEEE database on Apr. 23, 2012].*

Ferro, E., "Bluetooth and Wi-Fi wireless protocols: a survey and a comparison"; Wireless Communications, IEEE, Feb. 2005 vol. 12, Issue 1; pp. 12-26 [retrieved from IEEE database on Apr. 23, 2012].*

(No stated author), Cisco Aironet Wireless LAN Cient Adapters, chapter 5, Jun. 2004, Retrieved from the Internet <URL: web.archive.org/web/20040603182804/http://www.cisco.com/en/US/products/hw/wireless/ps4555/products_installation_and_configuration_guide_chapter09186a008007f943.html>, pp. 1-18 as printed.*

Graaff et al., Automatic Generation of Context-Sensitive Textual Help, 1993, Retrieved from the Internet <URL: ftp.cc.gatech.edu/pub/groups/gvu/tech-reports/1993/93-11.pdf>, pp. 1-7 as printed.*

Chen et al., Mixed-Mode WLAN: The Integration of Ad Hoc Mode with Wireless LAN Infrastructure, 2003, Retrieved from the Internet <URL: ieeexplore.ieee.org/xpls/abs_all.jsp?arnumber=1258236>, pp. 1-5 as printed.*

(No stated author), User Guide for Resource Manager Essentials, Software Release 4.0, 2005, Retrieved from the Internet <URL: cisco.com/en/US/docs/net_mgmt/ciscoworks_resource_manager_essentials/4.0/user/guide/UserGuideforRME40.pdf>, pp. 1-26 as printed.*

(No stated author), EZLAN.net, Wireless Bandwidth (Speed) and Latency, 2005, Retrieved from the Internet <URL: .ezlan.net/latency.html>, p. 1 as printed.*

No stated author, 802.11e—WLA MAC PHY specifications for QoS, 2005, IEEE, Retrieved from the Internet <URL: http://ieeexplore.ieee.org/xpl/mostRecentIssue.jsp?punumber=10328> pp. 1-211 as printed.*

Brent A. Miller, "Home Networking with Universal plug and play", IEEE Communications Magazine, Dec. 21, 2001, pp. 104-109.

"Bluetooth Quality of Service". Proposal submitted Oct. 7, 2003 (last modified), 15 pages, submitted to the IEEE P1451.5 project: "Draft Standard for a Smart Transducer Interface for Sensors and Actuators". URL: http://grouper.ieee.org/groups/1451/5/Proposals%20submitted/ (select: "Bluetooth Quality of Service1.doc"). New York, New York, United States.

* cited by examiner

FIG. 11

| 1101 | 1102 | 1103 | 1104 | 1105 | 1106 | 1107 |
|---|---|---|---|---|---|---|
| VIEW TV PROGRAM (HD IMAGES) | TV TUNER OPERABILITY | DISPLAY OPERABILITY | N,M | xxMbps | L | yyMbps |
| VIEW TV PROGRAM (SD IMAGES) | TV TUNER OPERABILITY | DISPLAY OPERABILITY | N,M | xxMbps | L | yyMbps |
| RECORD TV PROGRAM (HD IMAGES) | TV TUNER OPERABILITY | VIDEO RECORDING APPARATUS RECORDING OPERABILITY | N,M | xxMbps | L | yyMbps |
| RECORD TV PROGRAM (SD IMAGES) | TV TUNER OPERABILITY | VIDEO RECORDING APPARATUS RECORDING OPERABILITY | N,M | xxMbps | L | yyMbps |
| VIEW CAMERA VIDEO (HD IMAGES) | MOTION CAMERA OPERABILITY | DISPLAY OPERABILITY | N,M | xxMbps | L | yyMbps |
| VIEW CAMERA VIDEO (SD IMAGES) | MOTION CAMERA OPERABILITY | DISPLAY OPERABILITY | N,M | xxMbps | L | yyMbps |
| RECORD CAMERA VIDEO (HD IMAGES) | MOTION CAMERA OPERABILITY | VIDEO RECORDING APPARATUS RECORDING OPERABILITY | N,M | xxMbps | L | yyMbps |
| RECORD CAMERA VIDEO (SD IMAGES) | MOTION CAMERA OPERABILITY | VIDEO RECORDING APPARATUS RECORDING OPERABILITY | N,M | xxMbps | L | yyMbps |
| PLAY RECORDED IMAGE (HD IMAGES) | VIDEO RECORDING APPARATUS PLAYBACK OPERABILITY | DISPLAY OPERABILITY | N,M | xxMbps | L | yyMbps |
| PLAY RECORDED IMAGE (SD IMAGES) | VIDEO RECORDING APPARATUS PLAYBACK OPERABILITY | DISPLAY OPERABILITY | N,M | xxMbps | L | yyMbps |

F I G. 12

| SERVICE CONTENT | SERVICE EXECUTABILITY | DATA TRANSFER | |
|---|---|---|---|
| WATCH TV PROGRAM(HD IMAGES) | NONEXECUTABLE (TUNER OPERATING) | | |
| WATCH TV PROGRAM(SD IMAGES) | NONEXECUTABLE (TUNER OPERATING) | | |
| RECORD TV PROGRAM(HD IMAGES) | NONEXECUTABLE (TUNER, RECORDER OPERATING) | | |
| RECORD TV PROGRAM(SD IMAGES) | NONEXECUTABLE (TUNER, RECORDER OPERATING) | | |
| WATCH CAMERA VIDEO(HD IMAGES) | NONEXECUTABLE (UNABLE TO SECURE COMMUNICATION BAND) | DLS | TRY CHANGING INSTALLATION LOCATION |
| WATCH CAMERA VIDEO(SD IMAGES) | EXECUTABLE | AP | |
| RECORD CAMERA VIDEO(HD IMAGES) | NONEXECUTABLE (RECORDER OPERATING) | | |
| RECORD CAMERA VIDEO(SD IMAGES) | EXECUTABLE | AP | |
| PLAY RECORDED VIDEO(HD IMAGES) | NONEXECUTABLE (RECORDER OPERATING) | | |
| PLAY RECORDED VIDEO(SD IMAGES) | EXECUTABLE | DLS | |

FIG. 13

| SERVICE CONTENT | SERVICE EXECUTABILITY | DATA TRANSFER |
|---|---|---|
| WATCH TV PROGRAM (HD IMAGES) | NONEXECUTABLE (TUNER OPERATING) | |
| WATCH TV PROGRAM (SD IMAGES) | NONEXECUTABLE (TUNER OPERATING) | |
| RECORD TV PROGRAM (HD IMAGES) | NONEXECUTABLE (TUNER, RECORDER OPERATING) | |
| RECORD TV PROGRAM (SD IMAGES) | NONEXECUTABLE (TUNER, RECORDER OPERATING) | |
| WATCH CAMERA VIDEO (HD IMAGES) | EXECUTABLE | DLS |
| WATCH CAMERA VIDEO (SD IMAGES) | EXECUTABLE | DLS |
| RECORD CAMERA VIDEO (HD IMAGES) | NONEXECUTABLE (RECORDER OPERATING) | |
| RECORD CAMERA VIDEO (SD IMAGES) | EXECUTABLE | AP |
| PLAY RECORDED VIDEO (HD IMAGES) | NONEXECUTABLE (RECORDER OPERATING) | |
| PLAY RECORDED VIDEO (SD IMAGES) | EXECUTABLE | DLS |

F I G. 14

| SERVICE CONTENT | SERVICE EXECUTABILITY | DATA TRANSFER |
|---|---|---|
| WATCH CAMERA VIDEO(HD IMAGES) | EXECUTABLE | DLS |
| WATCH CAMERA VIDEO(SD IMAGES) | EXECUTABLE | DLS |
| RECORD CAMERA VIDEO(HD IMAGES) | NONEXECUTABLE (RECORDER OPERATING) | |
| RECORD CAMERA VIDEO(SD IMAGES) | EXECUTABLE | AP |
| PLAY RECORDED VIDEO(HD IMAGES) | NONEXECUTABLE (RECORDER OPERATING) | |
| PLAY RECORDED VIDEO(SD IMAGES) | EXECUTABLE | DLS |

FIG. 15

| SERVICE CONTENT | SERVICE EXECUTABILITY | DATA TRANSFER |
|---|---|---|
| WATCH TV PROGRAM(HD IMAGES) | EXECUTABLE | DLS |
| WATCH TV PROGRAM(SD IMAGES) | EXECUTABLE | DLS |
| RECORD TV PROGRAM(HD IMAGES) | EXECUTABLE | DLS |
| RECORD TV PROGRAM(SD IMAGES) | EXECUTABLE | DLS |
| WATCH CAMERA VIDEO(HD IMAGES) | EXECUTABLE | AP |
| WATCH CAMERA VIDEO(SD IMAGES) | EXECUTABLE | AP |
| RECORD CAMERA VIDEO(HD IMAGES) | EXECUTABLE | AP |
| RECORD CAMERA VIDEO(SD IMAGES) | EXECUTABLE | AP |
| PLAY RECORDED VIDEO(HD IMAGES) | EXECUTABLE | DLS |
| PLAY RECORDED VIDEO(SD IMAGES) | EXECUTABLE | DLS |

FIG. 21

| SERVICE CONTENT | SERVICE EXECUTABILITY | DATA TRANSFER |
|---|---|---|
| WATCH CAMERA VIDEO ON DISPLAY (HD IMAGES) | NONEXECUTABLE (UNABLE TO SECURE COMMUNICATION BAND) | DLS |
| WATCH CAMERA VIDEO ON DISPLAY (SD IMAGES) | EXECUTABLE | DLS |
| WATCH CAMERA VIDEO ON DISPLAY (STILL IMAGES) | EXECUTABLE | DLS |
| RECORD CAMERA VIDEO (HD IMAGES) | NONEXECUTABLE (RECORDER OPERATING) | AP |
| RECORD CAMERA VIDEO (SD IMAGES) | EXECUTABLE | AP |
| RECORD CAMERA VIDEO (STILL IMAGES) | EXECUTABLE | AP |

COMMUNICATION SYSTEM, COMMUNICATION APPARATUS, AND DISPLAY METHOD FOR THE SAME

TECHNICAL FIELD

The present invention relates to a communication system capable of data communication between a plurality of terminal apparatuses, a communication apparatus and a display method for the communication system.

BACKGROUND ART

In recent years, wireless LANs have become widespread as a communication medium for mobile devices such as notebook personal computers (hereinafter, "PC") and mobile information terminals. Wireless LANs have many advantages because of the nonnecessity for cables, ease of installation and aesthetic benefits, with popularization among desktop PCs, peripheral devices such as printers, and stationary information devices such as information home appliances being anticipated in the future.

The presence of devices networked on a wireless LAN can be readily ascertained by using network confirmation software standard with the OS (operating system) of PCs. In the case of information devices other than PCs, incorporating software with a similar function is technically feasible.

However, with network confirmation software, networked devices are simply listed, and ascertaining the functions executable using these devices as a system is not possible. The functions referred to here are for realizing requirements from the user's viewpoint, such as printing on a printer, and recording moving images, for example. Hereinafter, these functions will be collectively called "services".

In view of this, a communication apparatus has been disclosed that locates accessible communication devices, acquires service information provided by these communication devices, and displays only communication devices selected according to the service information (e.g., see patent document 1).

Since transmission in a wireless LAN is performed through space, the quality of the transmission channel is easily affected by the surrounding environment. It is thus extremely difficult for the user to be aware of the transmission quality at which information transmission is actually possible. In view of this, a wireless communication system has been disclosed that searches for accessible wireless apparatuses, registers these wireless apparatuses together with terminal information, specifies those registered wireless apparatuses with matching terminal attributes or terminal addresses, and monitors the communication state of the specified wireless apparatuses. If the communication state of a specified wireless apparatus subsequently changes, the wireless communication system displays the fact that the communication state of a specified wireless apparatus has changed (e.g., see patent document 2).

Patent documents 1 and 2 are as follows.
Patent document 1: JP 2000-305885A
Patent document 2: JP 2002-135199A However, the communication apparatus disclosed in patent document 1 simply displays communication devices that correspond to services. For example, nothing is disclosed with regard to the type of display that would be performed in the case where a service cannot be executed because the communication state is unfavorable, or because part of the communication band is currently being used by another service.

With the communication system disclosed in patent document 2, on the other hand, when there is a change in the communication state of a specified wireless communication apparatus, the fact that there has been a change is displayed or the user is informed using audio. However, there is no information whatsoever about whether the desired service is executable in the changed communication state, leaving the user to judge for him or herself.

There also exist devices, such as video (moving image) recording apparatuses, for example, whose recordable/reproducible image size or image quality via wireless communication varies depending on the availability of the communication band resulting from QoS (Quality of Service) control. However, patent documents 1 and 2 give no consideration whatsoever to the question of performing a display or notification informing the user about whether services are executable if such devices were used.

DISCLOSURE OF INVENTION

An object of the present invention is to present to the user in an easy to understand manner what services are currently available in a communication system.

A further object of the present invention is to present to the user in an easy to understand manner whether a terminal apparatus in a communication system is installed in the appropriate location.

To achieve the above objects, according to one embodiment of the present invention, a communication system capable of data communication between a plurality of terminal apparatuses is provided that comprises a device configuration confirmation unit adapted to confirm a device configuration of the communication system, an operating condition confirmation unit adapted to confirm an operating condition of each of the plurality of terminal apparatuses, a channel condition confirmation unit adapted to confirm a channel condition of data communication, and a service list display unit adapted to identifiably display on a display unit whether a service using a plurality of the terminal apparatuses is executable, based on confirmation results of the device configuration confirmation unit, the operating condition confirmation unit, and the channel condition confirmation unit.

Also, according to one embodiment of the present invention, a communication apparatus is provided that comprises an operating condition confirmation unit adapted to confirm an operating condition of each of a plurality of terminal apparatuses, based on a device configuration of a communication system containing the communication apparatus, a channel condition confirmation unit adapted to confirm a channel condition of data communication, based on the device configuration of the communication system containing the communication apparatus, and a display unit adapted to display whether a service using a plurality of the terminal apparatuses is executable, based on confirmation results of the operating condition confirmation unit and the channel condition confirmation unit.

Also, according to one embodiment of the present invention, a display method for a communication system capable of data communication between a plurality of terminal apparatuses is provided that comprises the steps of confirming a device configuration of the communication system, confirming an operating condition of each of the plurality of terminal apparatuses, confirming a channel condition of data communication, and identifiably displaying whether a service using a plurality of the terminal apparatuses is executable, based on a confirmation result in each of the confirmation steps.

Further features of the present invention will become apparent from the following description of exemplary embodiments with reference to the attached drawings.

BRIEF DESCRIPTION OF DRAWINGS

FIG. 11 shows an exemplary format of service list information created by the AP 101 in the first embodiment.

FIG. 12 shows an exemplary display of a service list by the display 103.

FIG. 13 shows an exemplary display of a service list by the display 103.

FIG. 14 shows an exemplary display of a service list by the display 103.

FIG. 15 shows an exemplary display of a service list by the display 103.

FIG. 21 shows an exemplary display of a service list displayed on an LCD 1814 of the digital

BEST MODE FOR CARRYING OUT THE INVENTION

Preferred embodiments of the present invention are described in detail below with reference to the drawings.

First Embodiment

In the first embodiment, an example is given in which an AP 101 exclusively performs confirmation of the system configuration, operating condition and channel condition, and services executable as a wireless communication system are displayed on a display 103.

Figure 1:
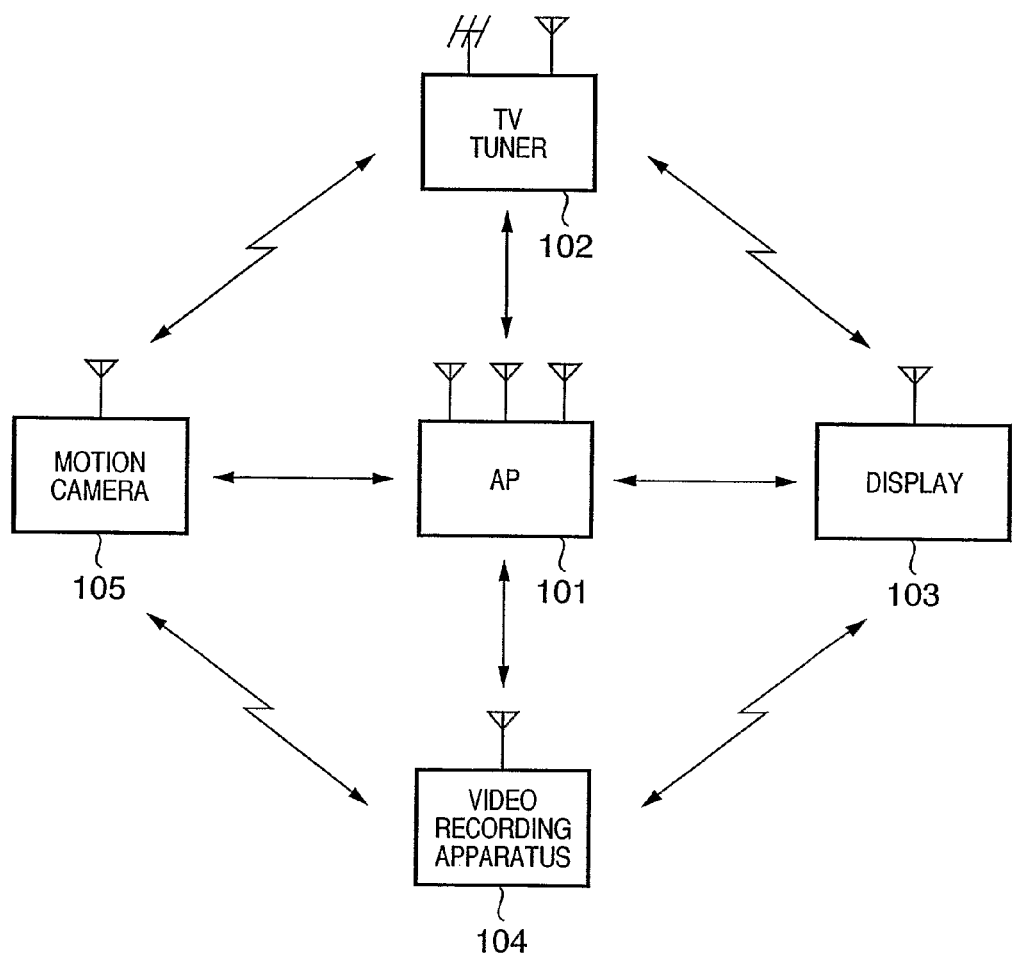
FIG. 1 shows an exemplary configuration of a wireless communication system in a first embodiment.

FIG. 1 shows an exemplary configuration of the wireless communication system in the first embodiment. In FIG. 1, 101 is a wireless access point (hereinafter, "AP") that relays the connection between terminal apparatuses. 102 is a TV tuner that receives TV broadcasts and outputs video data (in the present example, moving image data and audio data are referred to collectively as video data). 103 is a display that visualizes video data output from another terminal apparatus by outputting the data to a display device. 104 is a video recording apparatus that records video data output from another terminal apparatus, and outputs recorded video data to another terminal apparatus as a result of playing the video data. 105 is a motion camera that shoots video and outputs the shot video to another terminal apparatus.

The TV tuner 102, the display 103, the video recording apparatus 104, and the motion camera 105 are connected to each other by a wireless LAN via the AP 101. Here, wireless LAN modules mounted in the AP 101 and terminal apparatuses 102 to 105 conform to IEEE 802.11a and IEEE 802.11e. Also, QoS for allocating bands to high priority communication, and DLS (Direct Link Setup) for allowing terminal apparatuses to communicate directly are supported.

The wireless communication system shown in FIG. 1 can execute the following services through the wireless LAN.

viewing of TV programs using the TV tuner 102 and the display 103 recording of TV programs using the TV tuner 102 and the video recording apparatus 104 (recording is here assumed to also include audio data recording)

viewing of shot video using the motion camera 105 and the display 103 recording of shot video using the motion camera 105 and the video recording apparatus 104 viewing of recorded video using the video recording apparatus 104 and the display 105

Note that apart from the main data in the wireless communication system, command information for various operations and response information to the command information is communicated over the wireless LAN.

The internal configurations of the AP 101, the TV tuner 102, the display 103, the video recording apparatus 104, and the motion camera 105, which configure a wireless communication system, are described next in order.

Figure 2:
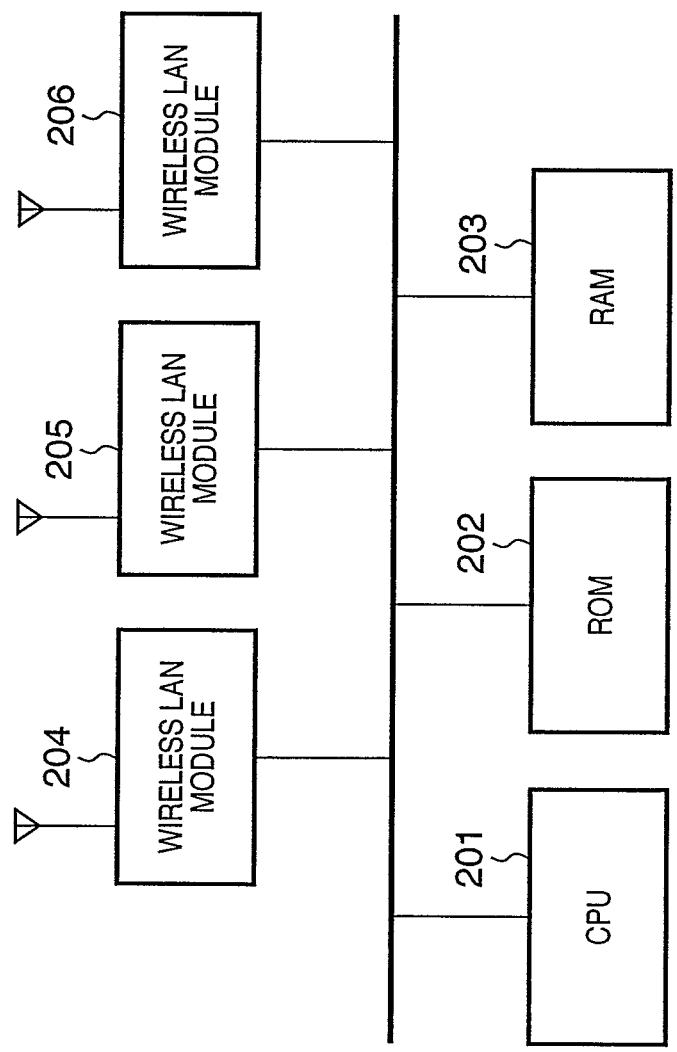
FIG. 2 is a block diagram showing an exemplary internal configuration of an AP 101.

FIG. 2 is a block diagram showing an exemplary internal configuration of the AP 101. In FIG. 2, 201 is a CPU that administers control of the entire AP 101. 202 is a ROM that stores operation programs and various control data of the CPU 201. 203 is a RAM that apart from being used by the CPU 201 as an operation memory, is also used as a buffer memory for data transfer performed between wireless modules described below.

204 to 206 are wireless modules conforming to IEEE 802.11a and IEEE 802.11e. As shown in FIG. 2, the AP 101 is equipped with three wireless modules, each of which operates using a different channel over the wireless LAN. Consequently, terminal apparatuses A and B may associate with the wireless LAN respectively via wireless modules 204 and 205 using different channels. In this case, the AP 101 is able to directly transfer data transferred from the terminal apparatus A via the wireless module 204 to the terminal apparatus B via the wireless module 205.

Also, terminal apparatuses C and D are naturally also able to associate with the wireless LAN via the same wireless module 206 using the same channel. In this case, the AP 101 temporarily stores data transferred from the terminal apparatus C via the wireless module 206 in the RAM 203, and then transfers the data to the terminal apparatus D via the wireless module 206.

Figure 3:
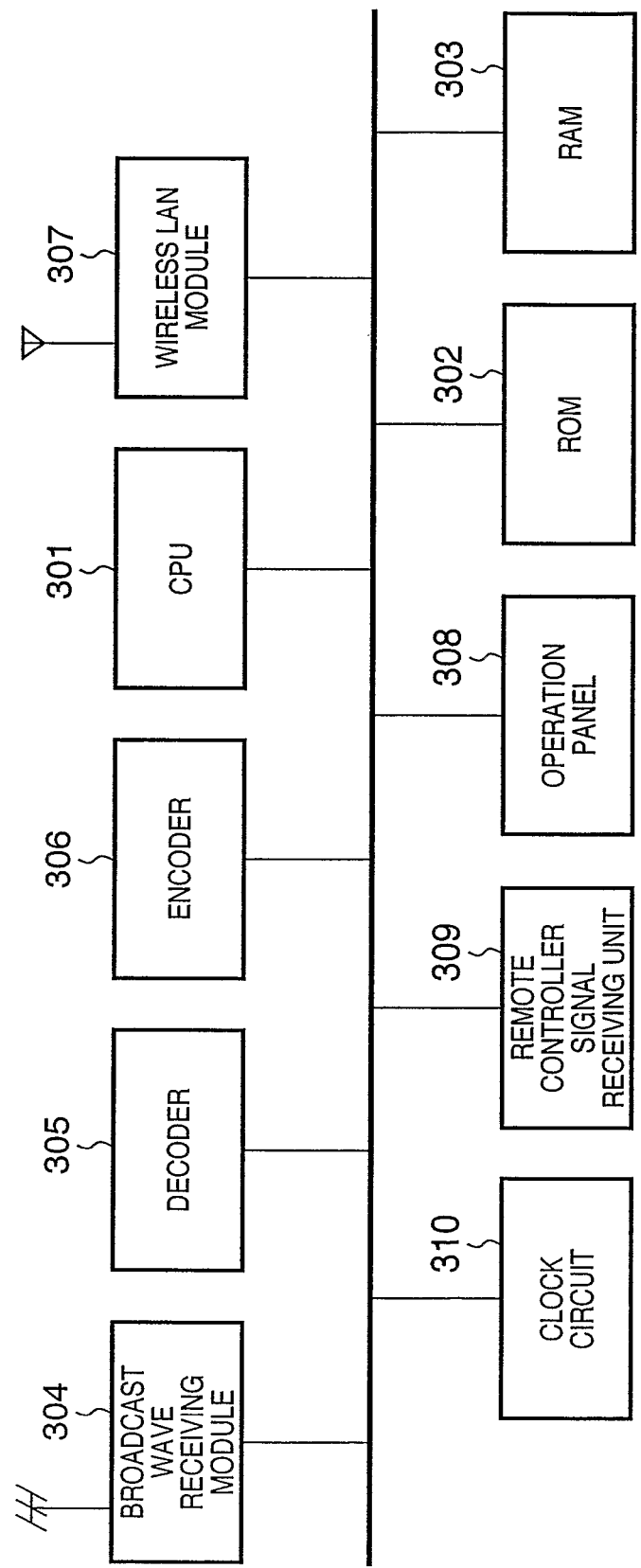
FIG. 3 is a block diagram showing an exemplary internal configuration of a TV tuner 102.

FIG. 3 is a block diagram showing an exemplary internal configuration of the TV tuner 102. In FIG. 3, 301 is a CPU that administers control of the entire TV tuner 102. 302 is a ROM that stores operation programs and various control data of the CPU 301. 303 is a RAM that apart from being used by the CPU 301 as an operation memory, is also used as a buffer memory for data transfer performed between the blocks over buses.

304 is a broadcast wave receiving module that receives broadcast waves and removes video data. Video data output from the broadcast wave receiving module 304 is transferred to other terminal apparatuses through the AP 101 or directly using DLS via a wireless LAN module 307.

A decoder 305 and an encoder 306 are mounted in the TV tuner 102, with video data being firstly decoded as necessary, and re-encoded at a desired compression ratio and encoding format. Re-encoded video data can be transferred, depending on the operating condition of the other terminal apparatus and the channel condition of the wireless LAN.

308 is an operation panel for giving operating instructions to the TV tuner 102, and includes push button switches and a display device. 309 is a remote controller signal receiving unit that receives the signals of a remote controller (remote controller apparatus; not shown) that uses infrared. Operating instructions to the TV tuner 102 can be given by the operation panel 308, the remote controller, and remotely from another terminal apparatus though a wireless LAN.

310 is a clock circuit for counting the date and time. Here, the operation of the TV tuner 102 can be scheduled using the output of clock circuit 310 as a trigger. As a result of this operation scheduling, scheduled program viewing at a prescribed date and time can be performed in the case where video data is transferred to the display 103, and scheduled program recording at a prescribed date and time can be performed in the case where video data is transferred to the video recording apparatus 104.

Figure 4:
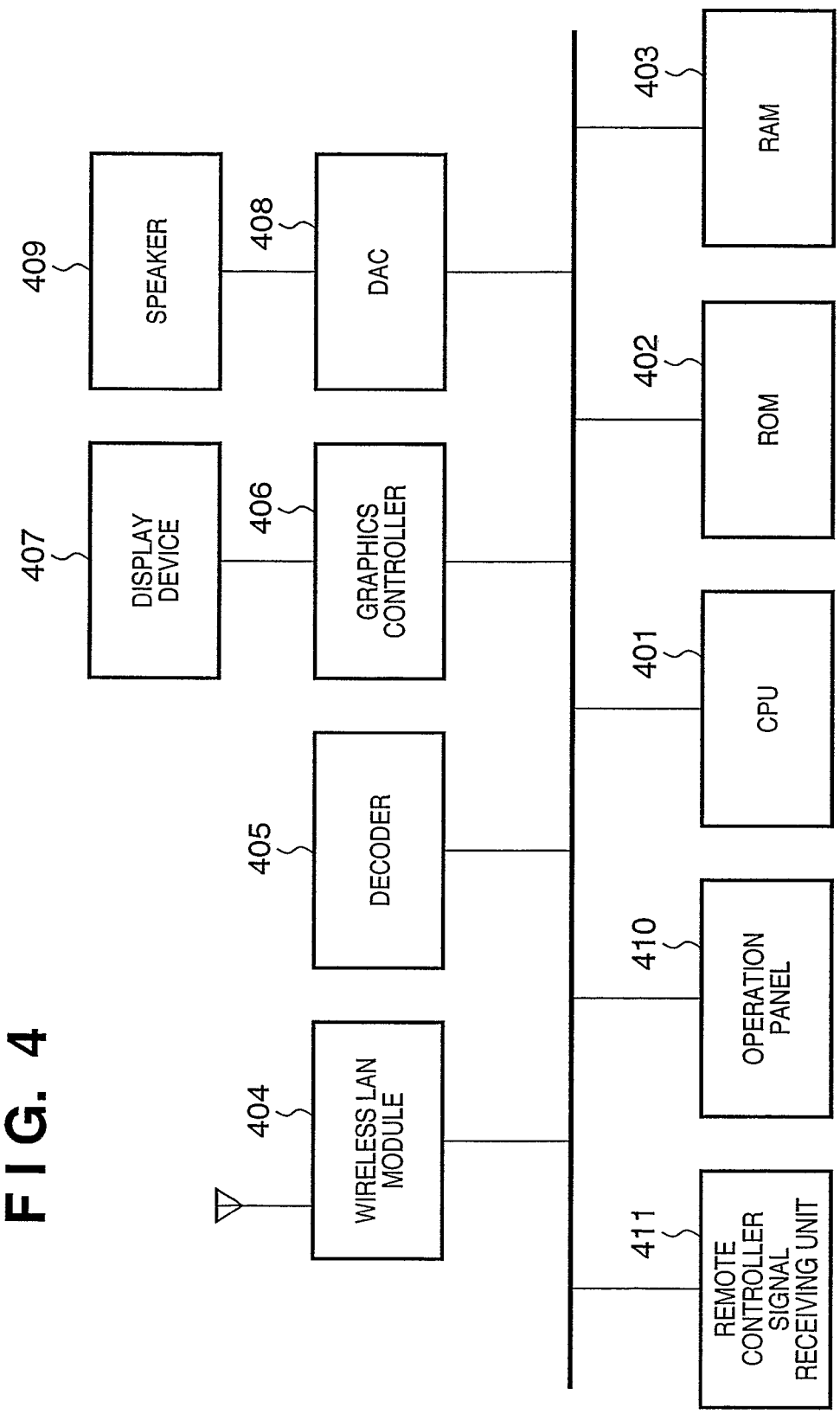
FIG. 4 is a block diagram showing an exemplary internal configuration of a display 103.

FIG. 4 is a block diagram showing an exemplary internal configuration of the display 103. In FIG. 4, 401 is a CPU that administers control of the entire display 103. 402 is a ROM that stores operation programs and various control data of the CPU 401. 403 is a RAM that apart from being used by the CPU 401 as an operation memory, is also used as a buffer memory for data transfer performed between the blocks over buses.

404 is a wireless LAN module that performs data communication with other terminal apparatuses through the AP 101 or by DLS. Video data transferred from another terminal apparatus is sent to a graphics controller 406 and a DAC (Digital Audio Converter) 408 through a decoder 405. Finally, the processed data is output from a display device 407 (e.g., an LCD) and a speaker 409.

410 is an operation panel for giving operating instructions to the display 103, and is configured from press button switches and the like. 411 is a remote controller signal receiving unit that receives the signals of a remote controller (not shown) that uses infrared. Here, operating instructions to the display 103 can be given by the operation panel 410, the remote controller, and remotely from another terminal apparatus though a wireless LAN. The display 103 can display a plurality of video streams at the same time using a split screen or a picture-in-picture function.

Figure 5:
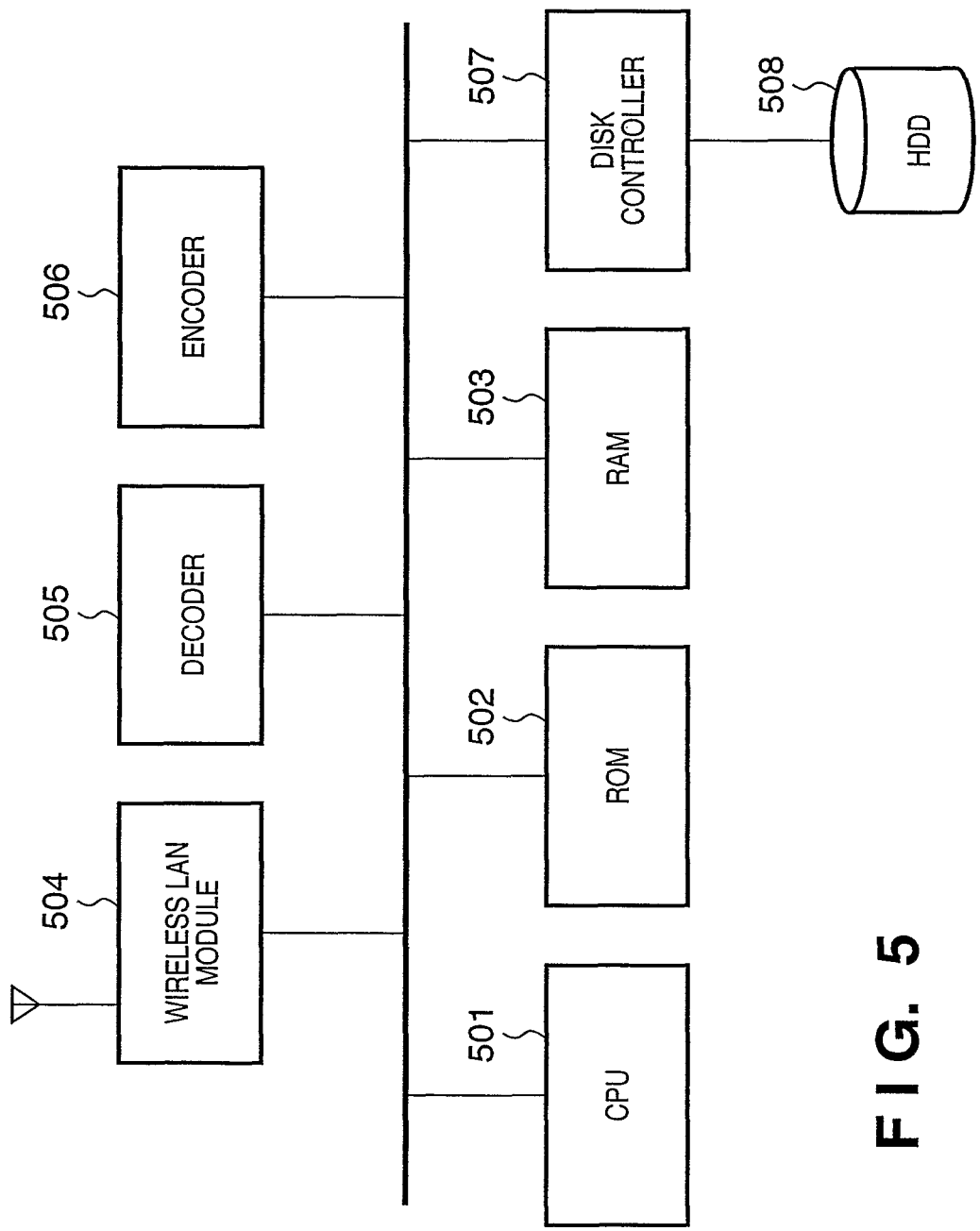
FIG. 5 is a block diagram showing an exemplary internal configuration of a video recording apparatus 104.

FIG. 5 is a block diagram showing an exemplary internal configuration of the video recording apparatus 104. In FIG. 5, 501 is a CPU that administers control of the entire the video recording apparatus 104. 502 is a ROM that stores operation programs and various control data of the CPU 501. 503 is a RAM that apart from being used by the CPU 501 as an operation memory, is also used as a buffer memory for data transfer performed between the blocks over buses.

504 is a wireless LAN module that performs data communication with other terminal apparatuses through the AP 101 or by DLS. 508 is a hard disk drive (HDD) that stores video and other data. The HDD 508 is controlled via a disk controller 507.

In the case of recording, video data transferred from another terminal apparatus is written directly to the HDD 508. In the case of playback, video data is read from the HDD 508, and transferred to another terminal apparatus via the wireless LAN module 504.

A decoder 505 and an encoder 506 are mounted in the video recording apparatus 104, with video data being firstly decoded as necessary, and re-encoded at a desired compression ratio and encoding format. Re-encoded video data can be transferred at the time of playback, depending on the operating condition of the other terminal apparatus and the channel condition of the wireless LAN.

Note that operating instructions to the video recording apparatus 104 can be given remotely from another terminal apparatus through a wireless LAN.

Also, with HD (High-Definition) image (including approx 27 Mbps data streams and audio data) recording/playback, the video recording apparatus 104 is only able to execute either recording or playback. However, with SD (Standard-Definition) image (including approx 8 Mbps data streams and audio data) recording/playback, the video recording apparatus 104 is able to simultaneously execute any combination of operations, such as "recording-recording", "recording-playback" and "playback-playback".

Figure 6:
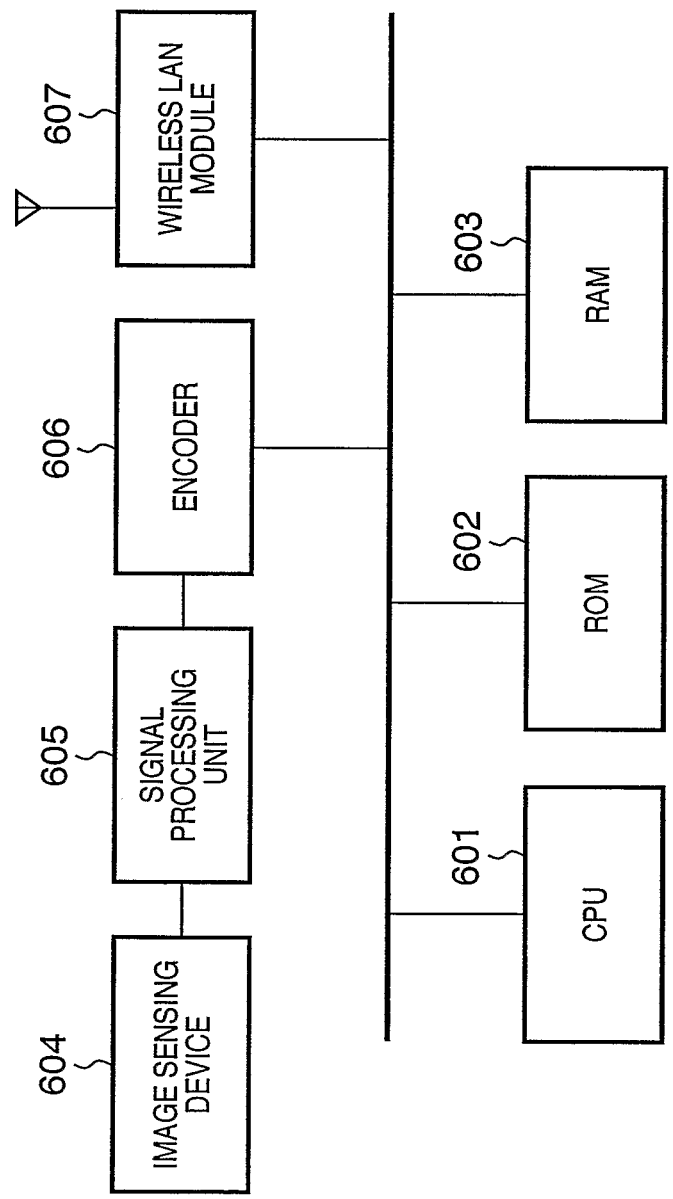
FIG. 6 is a block diagram showing an exemplary internal configuration of a motion camera 105.

FIG. 6 is a block diagram showing an exemplary internal configuration of the motion camera 105. In FIG. 6, 601 is a CPU that administers control of the entire the motion camera 105. 602 is a ROM that stores operation programs and various control data of the CPU 601. 603 is a RAM that apart from being used by the CPU 601 as an operation memory, is also used as a buffer memory for data transfer performed between the blocks over buses.

604 is an image sensing device such as a CCD, and converts images imaged by a lens (not shown) into electronic data. Prescribed processing is performed on the digitized data by a signal processing unit 605, and the processed data is then subject to prescribed encoding such as Motion-JPEB or MPEG2 by an encoder 606.

607 is a wireless LAN module that performs data communication with other terminal apparatuses through the AP 101 or by DLS. Here, video data encoded by the encoder 606 is transferred to another terminal apparatus via the wireless LAN module 607.

Note that the compression ratio, type of encoding, image size, frame rate and the like of the output video data is variable, and settings can be performed remotely from another terminal apparatus through a wireless LAN.

Processing in which the AP 101 inquires into the operating condition and communication condition of terminal apparatuses 102 to 105 of the wireless communication system and creates a usable service list based on the results is described next using FIGS. 7 to 9.

Figure 7:
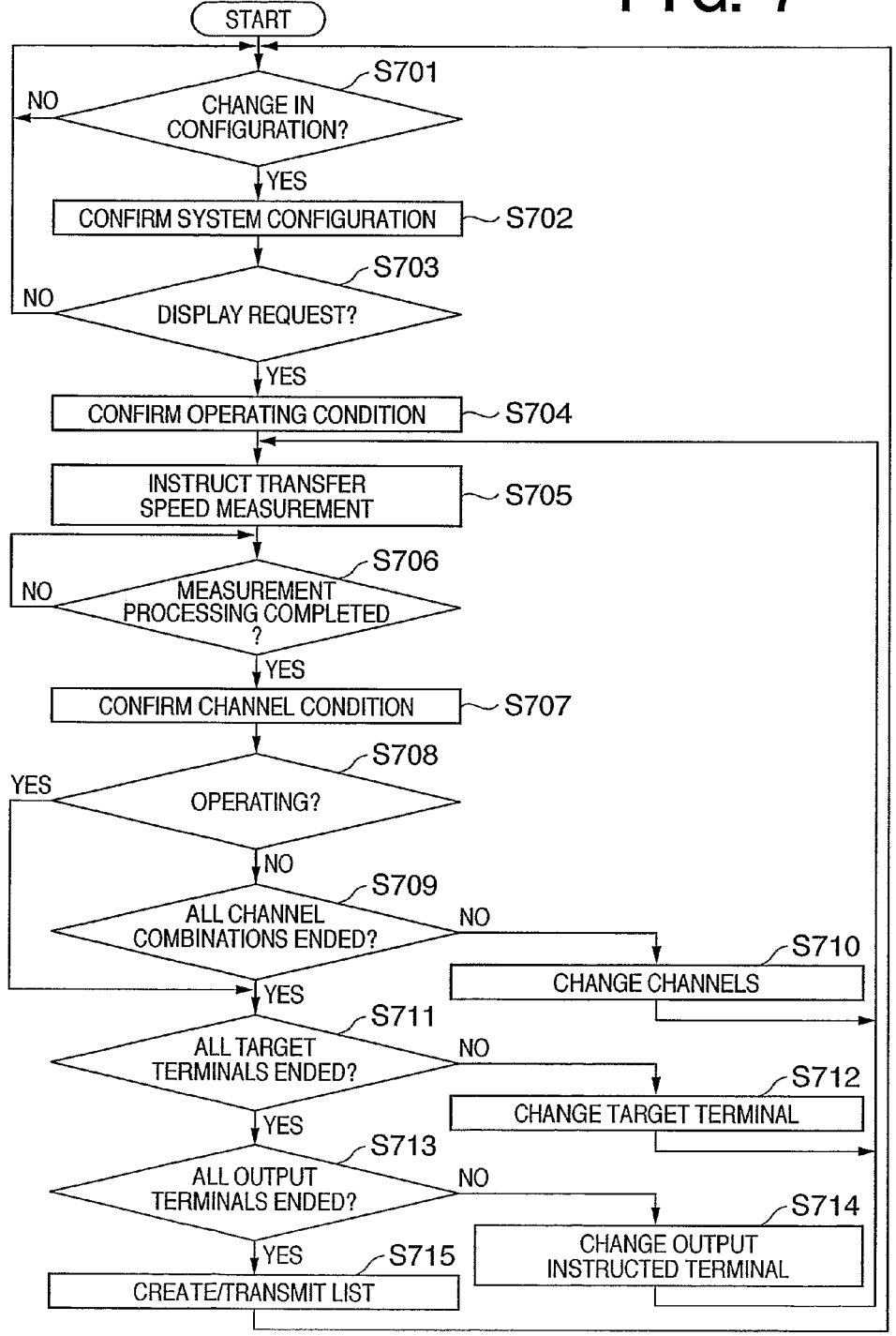
FIG. 7 is a flowchart showing processing by the AP 101 in the first embodiment.

FIG. 7 is a flowchart showing processing by the AP 101 in the first embodiment. Firstly, the AP 101 determines in step S701 whether there has been a change in the configuration of the wireless LAN. Here, if there has been a change, that is, if a terminal apparatus has associated with or disassociated from the wireless LAN, the processing proceeds to step S702, where the AP 101 confirms the system configuration information. Specifically, if a terminal apparatus has associated with the wireless LAN, the AP 101 acquires the device type information of the terminal apparatus and the function information possessed by the apparatus. If a terminal apparatus has disassociated from the wireless LAN, this information is erased. The device type information and the function information of terminal apparatuses associated with the wireless LANs of the wireless modules 204 to 206 of the AP 101 is thereby stored in the RAM 203 as system configuration information.

Next, the AP 101 determines in step S703 whether service list display has been requested by the display 103. If there has been a display request, the processing proceeds to step S704, where the AP 101 confirms the operating condition of all terminal apparatuses associated with the wireless LANs, and stores the operating conditions in the RAM 203. Note that an operating condition is basically information showing whether the main function of a terminal apparatus is running, although with a terminal apparatus capable of parallel processing a plurality of operations (e.g., recording and playback by video recording apparatus), the AP 101 confirms the operating condition of each operation.

Next, in step S705, the AP 101 instructs a terminal apparatus with an output function for outputting video data to measure the data transfer speed, with a prescribed terminal apparatus as the communication target, and waits at S706 for the measurement processing to be completed. The measurement of data transfer speed involves measuring the effective data transfer speed between prescribed terminal apparatuses. Note that measurement processing is described in detail later using FIG. 8.

On completion of the measurement processing, the processing proceeds to step S707, where the AP 101 confirms the channel condition after receiving the measurement result from the output terminal apparatus instructed to measure data transfer speed in step S704 (hereinafter, output instructed terminal apparatus), and stores the channel condition in the RAM 203.

Next, in step S708, the AP 101 determines whether the communication target terminal apparatus or the output instructed terminal apparatus is running. Here, the AP 101 merely determines whether the apparatus is running or in standby, even in the case of a terminal apparatus capable of processing a plurality of operations in parallel. If both apparatuses are in standby, the processing proceeds to step S709, in which the AP 101 determines whether the measurement processing has been completed for all channel combinations used by the three wireless LAN modules. Here, if the measurement processing has not ended, the processing proceeds to step S710, in which the AP 101 instructs that the channel be changed, and repeats the processing from step S705. That is, in this case the AP 101 instructs the communication target terminal apparatus and the output instructed terminal apparatus to firstly disassociate from the wireless LAN and then re-associate using a different channel.

Note that the change in channel is executed separately rather than at the same time for the communication target terminal apparatus and the output instructed terminal apparatus, respectively. That is, with 3×3 channels, nine changes are made.

If the measurement processing for all channel combinations in step S709 has ended, the processing proceeds to step S711, in which the AP 101 determines whether the processing from step S705 has been executed, having specified all potential communication target terminal apparatuses. If the processing has not yet ended, the processing proceeds to step S712, in which the AP 101 instructs that the communication target terminal apparatus be changed, and repeats the processing from step S705.

On the other hand, if either the communication target terminal apparatus or the output instructed terminal apparatus is running in step S708, the AP 101 skips the processing for changing channels, and proceeds to step S711. This is to avoid the possibility of processing being affected by a change in channel when a terminal apparatus is operating.

Next, if the processing from step S705 has been executed in step S711, having specified all potential communication target terminal apparatuses, the processing proceeds to step S713, in which the AP 101 determines whether processing from step S705 has been executed, having specified all output instructed terminal apparatuses. If the processing has not yet ended, the processing proceeds to step S714, in which the AP 101 changes the output instructed terminal apparatus, and repeats the processing from step S705. If in step S713 the above processing has been executed, having specified all output instructed terminal apparatuses, the processing proceeds to step S715, in which the AP 101 creates service list information based on the system configuration information, the operation conditions and the channel conditions, and transmits the service list information to the display 103.

Note that a specific example of service list information created by the AP 101 is given later together with the description of processing to display service list information by the display 103.

Figure 8:
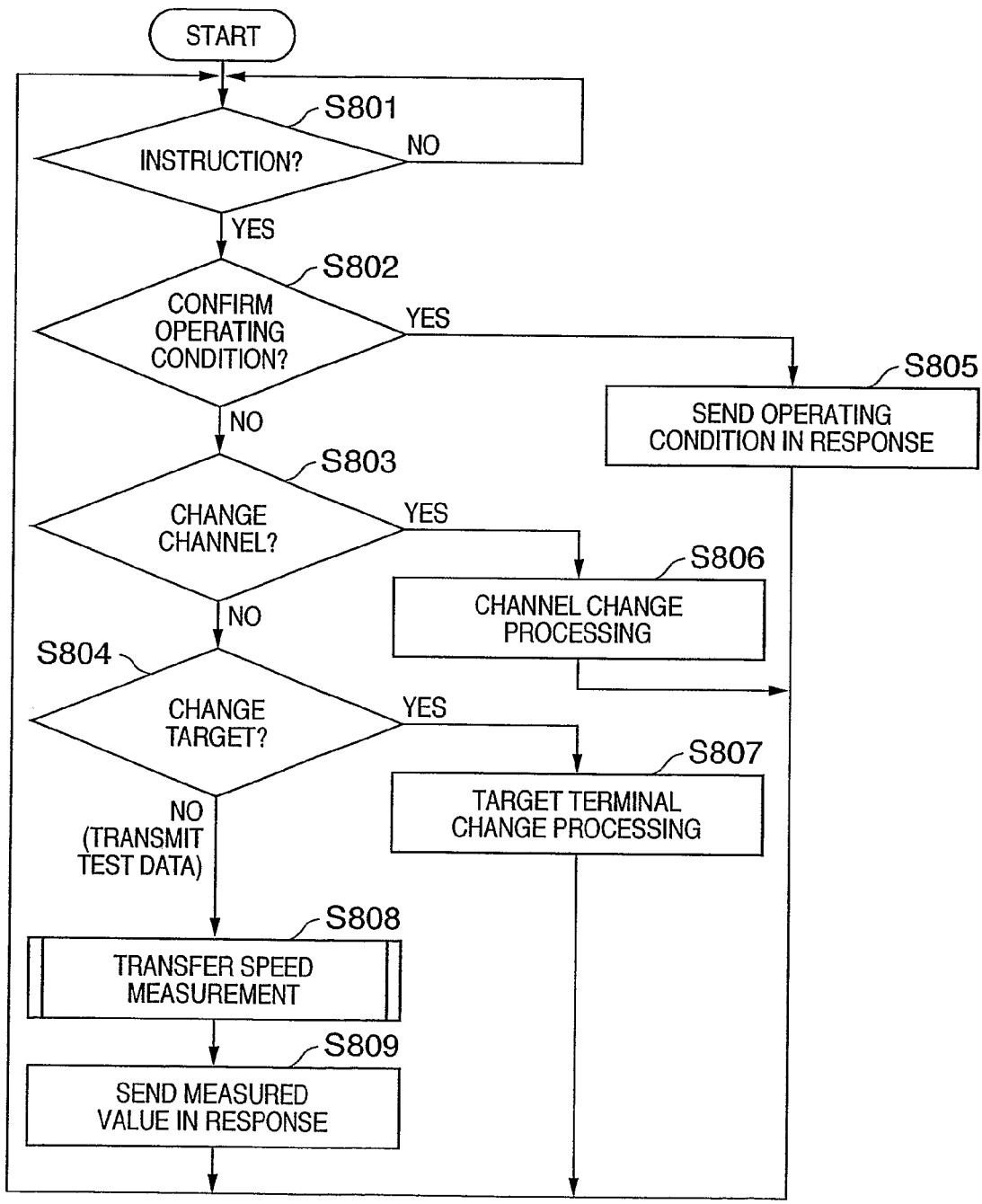
FIG. 8 is a flowchart showing processing by a terminal apparatus in the first embodiment.

Processing by a terminal apparatus to measure transfer speed, having been instructed by the AP 101, is described here using FIG. 8.

FIG. 8 is a flowchart showing processing by a terminal apparatus in the first embodiment. Firstly, in step S801, the terminal apparatus waits for an instruction from the AP 101, and when an instruction is received, the terminal apparatus determines in steps S802 to S804 whether the instruction is to confirm operating conditions, change channels, change the communication target for transmission of test data, or measure data transfer speed. Here, if operating condition confirmation, the processing proceeds to step S805, in which the terminal apparatus sends its operating condition to the AP 101 in response.

In the case of changing channels, the processing proceeds to step S806, in which the terminal apparatus executes processing to change the channel of the wireless LAN. Specifically, the terminal apparatus executes processing to firstly disassociate from the wireless LAN and then re-associate with the wireless LAN using a different channel. If, however, the terminal apparatus is operating, having already communicated video data or the like with another terminal apparatus, the channel change instruction is rejected and the channel is not changed.

While the operating condition confirmation and channel change processing is processing common to all terminal apparatuses, the processing after step S804 is only executed by the output terminal apparatus. If the instruction in step S804 is to change the communication target, the processing proceeds to step S807, in which the terminal apparatus changes the communication target apparatus against which data transfer speed is to be measured, as instructed. If the instruction in step S804 is to measure data transfer speed, the processing proceeds to step S808, in which the terminal apparatus measures the data transfer speed of the communication target terminal apparatus. This measuring of data transfer speed is described later using FIG. 9. Once the data transfer speed has been measured, the processing proceeds to step S809, in which the terminal apparatus sends the measured value to the AP 101 in response. The above processing is repeatedly executed whenever an instruction is received from the AP 101.

Figure 9:
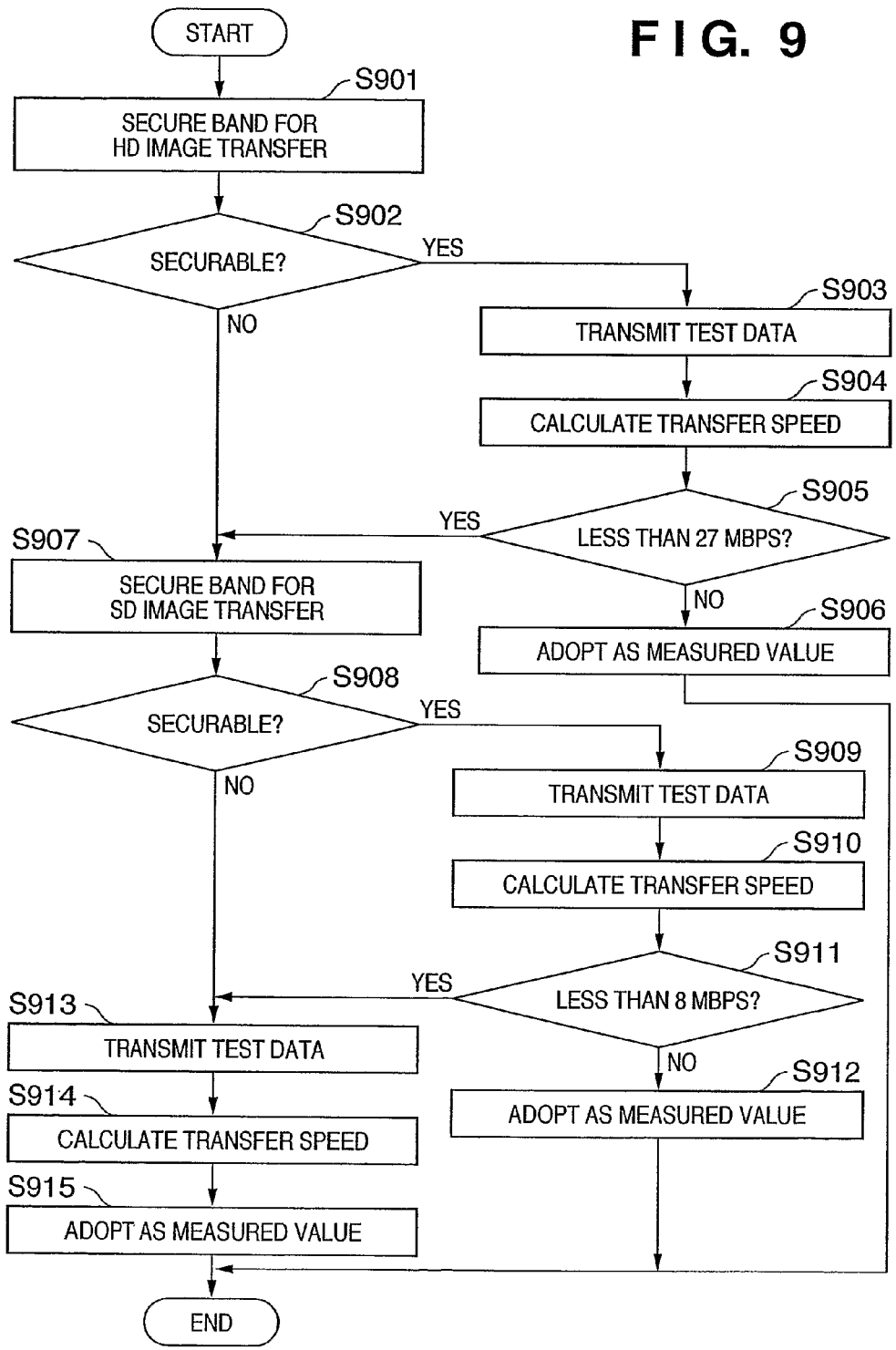
FIG. 9 is a flowchart showing a detail of data transfer speed measurement processing in the first embodiment.

FIG. 9 is a flowchart showing a detail of data transfer speed measurement processing in the first embodiment. Firstly, in step S901, the terminal apparatus uses QoS control to try and secure sufficient band for transferring HD images (specifically, approx 27 Mbps). Next, in step S902, the terminal apparatus determines whether the band is securable, and if securable, the processing proceeds to step S903, in which the terminal apparatus transmits test data to the communication target terminal apparatus. This test data is arbitrary data of prescribed size, and in terms of content, any data is acceptable. Consequently, the communication target terminal apparatus has only to simply receive the test data, and does not have to perform any operation based on the test data. Of course, the lower layer protocol of the wireless LAN is processed normally.

Next, in step S904, the terminal apparatus measures the time actually required for the test data to be transmitted, and calculates the data transfer speed in Mbps from the measured time. If the calculated value in step S905 is 27 Mbps or greater, the processing proceeds to step S906, in which the terminal apparatus adopts this value as the measured value, and ends the processing.

If in step S902 the band is not securable, or if the calculated value in step S905 is less than 27 Mbps, the processing proceeds to step S907, given that sufficient band for transferring HD images could not be secured. In step S907, the terminal apparatus uses QoS control to try and secure sufficient band for transferring SD images (specifically, approx 8 Mbps). Next, in step S908 the terminal apparatus determines whether the band is securable, and if securable, the processing proceeds to steps S909 and S910, in which the terminal apparatus transmits test data to the communication target terminal apparatus and calculates the data transfer speed. If the calculated value in step S911 is 8 Mbps or greater, the processing proceeds to step S912, the terminal apparatus then adopts this value as the measured value, and ends the processing.

If sufficient band for transferring SD images cannot be secured in step S908, or if the calculated data transfer speed in step S911 is less than 8 Mbps, the processing proceeds to step S913. In step S913, the terminal apparatus transmits test data to the communication target terminal apparatus using normal procedures, without trying to secure band using QoS control, and calculates the data transfer speed in step S914. In step S915, the terminal apparatus then adopts this value as the measured value, and ends the processing.

Note that if the output instructed terminal apparatus and the communication target terminal apparatus are associated with the same channel of the wireless LAN and support DLS, data transfer is also performed using DLS, rather than only performing data transfer relayed using the AP 101, and both data transfer speeds are measured.

If either the output instructed terminal apparatus or the communication target terminal apparatus supports DLS, the measured value is set to 0 Mbps, and if DLS is supported but actual communication ends unsuccessfully, the measured value is set to −1 Mbps.

Figure 10:
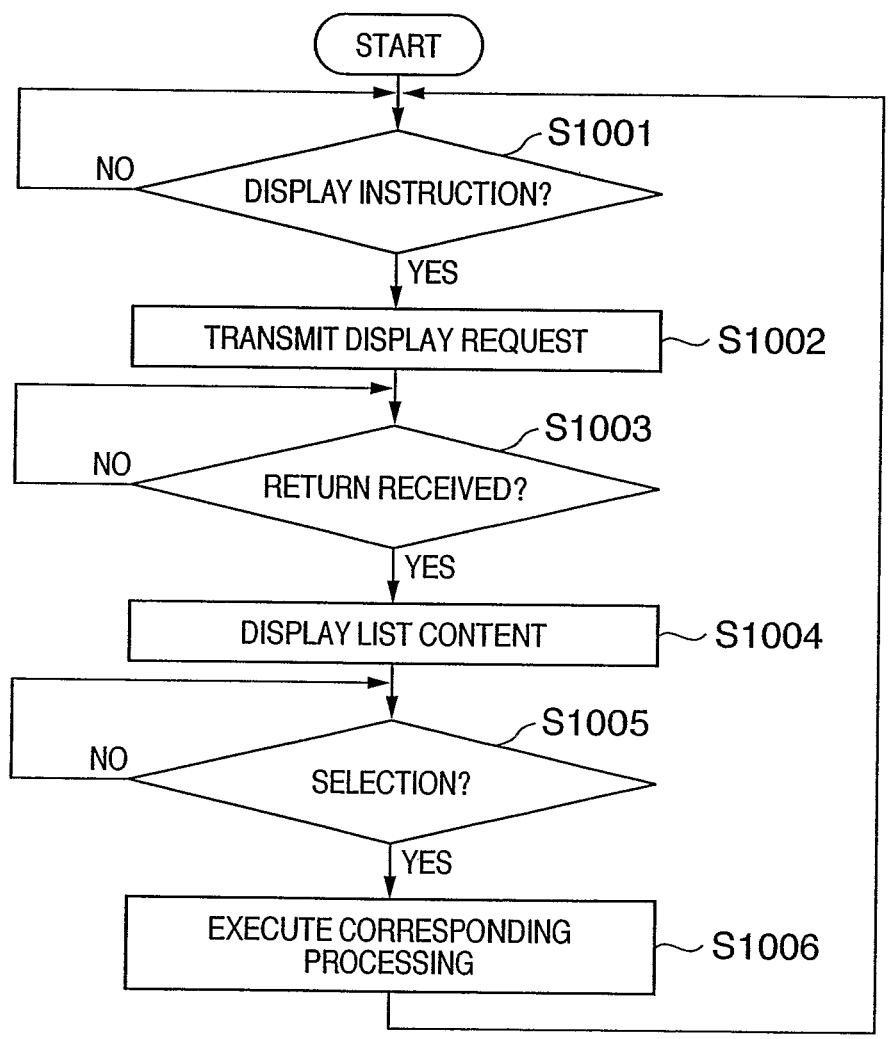
FIG. 10 is a flowchart showing processing by the display 103 in the first embodiment.

The processing by the display 103 for displaying the service list information from the AP 101, and executing the service selected by the user is described here using FIG. 10.

FIG. 10 is a flowchart showing processing by the display 103 in the first embodiment. Firstly, in step S1001, the display 103 waits for the user to give the instruction to display a service list. Specifically, the display 103 waits for the user to give a display instruction via the operation panel 410 or the remote controller signal receiving unit 411. When there is a display instruction, the processing proceeds to step S1002, in which the display 103 transmits a display request to the AP 101. Next, in step S1003 the display 103 waits for a response to the display request; that is, for service list information to be sent from the AP 101 in response.

When service list information is sent in response, the processing proceeds to step S1004, where the display 103 displays the list content on the display device 407, and waits at the subsequent step S1005 for the user to select a desired service from the list content. Here, when a service is selected, the processing proceeds to step S1006, where the display 103 executes processing that corresponds to the selected service (including remote operations on another terminal apparatus).

FIG. 11 shows an exemplary format of service list information created by the AP 101 in the first embodiment. 1101 shown in FIG. 11 are services executable in the wireless communication system. 1102 and 1103 are operation availability information on terminal apparatuses required for executing the services. 1104 are wireless LAN channels used for data transfer through the AP 101. N and M show that the terminal apparatus recited in 1102 (output terminal apparatus) transfers data to the AP 101 by the N channel, and that the AP 101 relays the data to the terminal apparatus recited in 1103 (input terminal apparatus) by the M channel. 1105 is the data transfer speed at this time. Here, there are nine combinations of N and M, although the combination with the most favorable data transfer speed is selected for the list information.

1106 is the wireless LAN channel used by DLS. 1107 is the data transfer speed at this time. Here, there are three possible values of L shown in 1106, although the channel with the most favorable data transfer speed is selected for the list information. Note that if DLS is not supported, L=0 and the data transfer speed is set to 0 Mbps, and if DLS is supported but actual communication ends unsuccessfully, the channel with the most band available is selected for L, and the data transfer speed is set to −1 Mbps.

An exemplary display of service list information on the display device 407 of the display 103 is described here using FIGS. 12 to 15.

FIG. 12 shows an exemplary display of a service list by the display 103. In the first embodiment, the list of service content is displayed together with the possibility of execution, as is clear from the figure. If the service is "nonexecutable", the reason is displayed in parentheses. Further, "nonexecutable" is set if there is no excess band on the circuit because of other communication even when the terminal apparatus is in standby, resulting in insufficient data transfer speed. In this case, the reason displayed in parentheses is "unable to secure communication band".

Note that in the first embodiment, "nonexecutable" is set if the data transfer speed falls below 27 Mbps with transfer of HD images and below 8 Mbps with transfer of SD images.

It is also displayed whether data transfer is by relay via the AP 101 (AP) or by direct communication between the terminal apparatuses (DLS) in accordance with the service content. Here, direct communication is prioritized for display if services are executable for both relayed data transfer and direct data transfer.

If, however, "nonexecutable" is displayed because there is insufficient data transfer speed for relayed data transfer, and direct communication was unsuccessful despite DLS being supported, "DLS" is displayed, followed by a display recommending a change in installation location. This implies that direct communication using DLS is not executable with the current positional relationship of the terminal apparatuses, in the case where there is insufficient data transfer speed for relayed data transfer via the AP 101, and the possibility exists of resolving this lack of data transfer speed by direct communication using DLS.

In other words, a display recommending a change in the installation location of the terminal apparatus is performed because of the possibility of being able to execute the service by changing the installation location to a position that allows direct communication by DLS. Particularly in the case where the terminal apparatus is a mobile apparatus, the user carrying the apparatus merely has to move it to a suitable position.

Here, service list display is requested after direct communication is made executable by the user changing the installation location. FIG. 13 shows an exemplary redisplay of a service list by the display 103. As shown in FIG. 13, the service execution possibility column for "view camera video (HD images)" has changed from "nonexecutable" to "executable".

Here again, if the TV tuner 102 disassociates from the wireless LAN, for example, the device type information and the function information for the TV tuner 102 is erased by the AP 101 in confirming the system configuration (S702). FIG. 14 shows an exemplary display of a service list in the case where the TV tuner 102 has disassociated from the wireless LAN. As shown in FIG. 14, the four services relating to the TV program have been deleted from the service list.

The first embodiment is configured to enable the user to select a desired service from the displayed list. Specifically, service items can be selected using the operation panel 410 or the cursor key on the remote controller. Here, when a service is selected, the item of the selected service is highlighted, as shown in FIG. 12, for example. Then, if an execution key or the like is depressed at the highlighted position, the desired service is executed. Here, the display 103 performs a remote operation on the terminal apparatus corresponding to the service, and displays video data output as a result of the remote operation on the display device 407.

Note that all services are listed in FIGS. 12 to 14, irrespective of their executability. However, a list of services may be displayed after having performed suitable filtering to display only executable services, or only nonexecutable services, or only services relating to specific terminal apparatuses. Needless to say, suitable pictographic characters or icons may be used in display, rather than only characters as illustrated.

Next, when service list display is performed with none of the services currently being executed, all services should basically be displayed as "executable", as shown in FIG. 15. If "nonexecutable (unable to secure communication band)" is displayed for any of services at this time, this means that the terminal apparatus relating to the service is installed in a poor wireless environment.

Further, sometimes "AP", that is, that the service can only be executed with communication relayed through a wireless access point, is displayed even if a service realized in a combination of terminal apparatuses that enable direct communication is "executable". This indicates that the two terminal apparatuses are installed in locations at which direct communication is not possible (or direct communication is possible, but actual data transfer speed is not favorable).

According to the first embodiment, it is possible to present to the user in an easy to understand manner whether a wireless access point and terminal apparatuses in a wireless communication system are installed in suitable locations. That is, much superior usability can be exhibited, even in the case where a user searches for the optimum installation location for apparatuses when setting up a wireless communication system.

Second Embodiment

Next, a second embodiment according to the present invention is described in detail with reference to the drawings. In the first embodiment, the AP 101 exclusively performs the processing for confirming the system configuration, operating condition and channel condition. However, in the second embodiment, part of the confirmation processing is executed by the terminal apparatuses.

Figure 16:
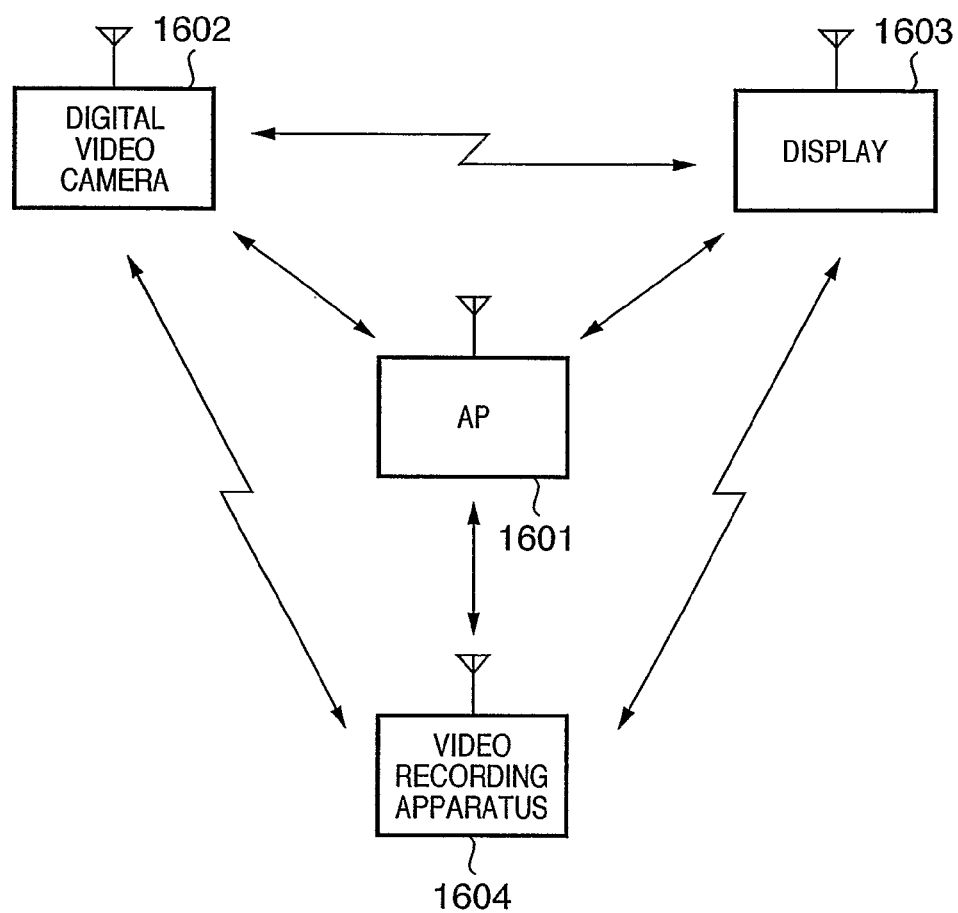
FIG. 16 shows an exemplary configuration of a wireless communication system in a second embodiment.

FIG. 16 shows an exemplary configuration of a wireless communication system in the second embodiment. In FIG. 16, 1601 is a wireless access point that relays the connection between terminal apparatuses, and differs from the AP 101 shown in FIG. 1 in only being equipped with a single wireless LAN module. 1602 is a digital video camera that shoots and records moving images (including audio) or still images to local storage media in the apparatus, and outputs either recorded or live video to another terminal apparatus. 1603 and 1604 are the same as the display 103 and the video recording apparatus shown in FIG. 1.

Note that the display 1603, the video recording apparatus 1604 and the digital video camera 1602 are connected to each other by a wireless LAN via the AP 1601. Here, the wireless LAN modules mounted in the AP 1601 and the terminal apparatuses 1602 to 1604 conform to IEEE 802.11a and IEEE 802.11e, similarly to the system shown in FIG. 1.

The internal configurations of the AP 1601 and the digital video camera 1602 configuring a wireless communication system are described here in order.

Figure 17:
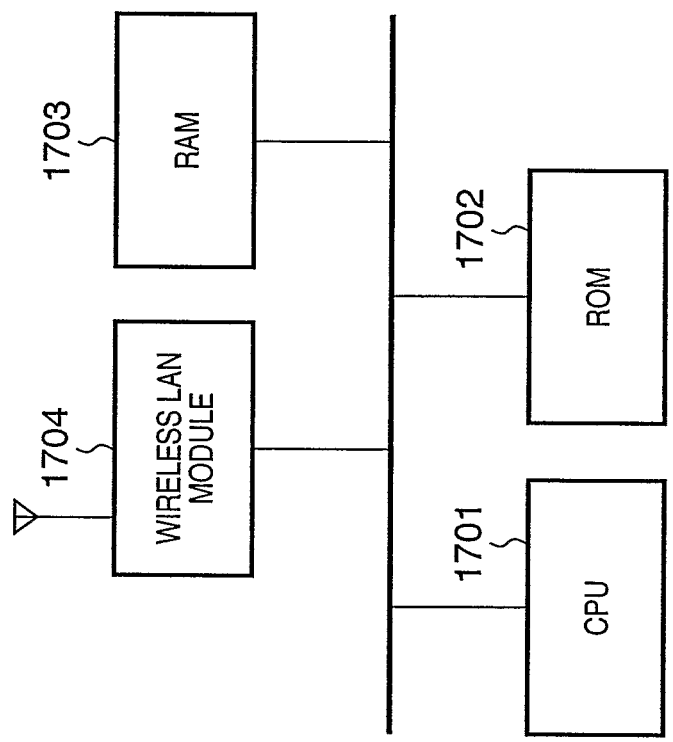
FIG. 17 is a block diagram showing an exemplary internal configuration of an AP 1601.

FIG. 17 is a block diagram showing an exemplary internal configuration of the AP 1601. In FIG. 17, 1701 to 1703 are a CPU, a ROM and a RAM having similar functions to 201 to 203 shown in FIG. 2. 1704 is a wireless LAN module, with only a single wireless module being mounted in the second embodiment.

Figure 18:
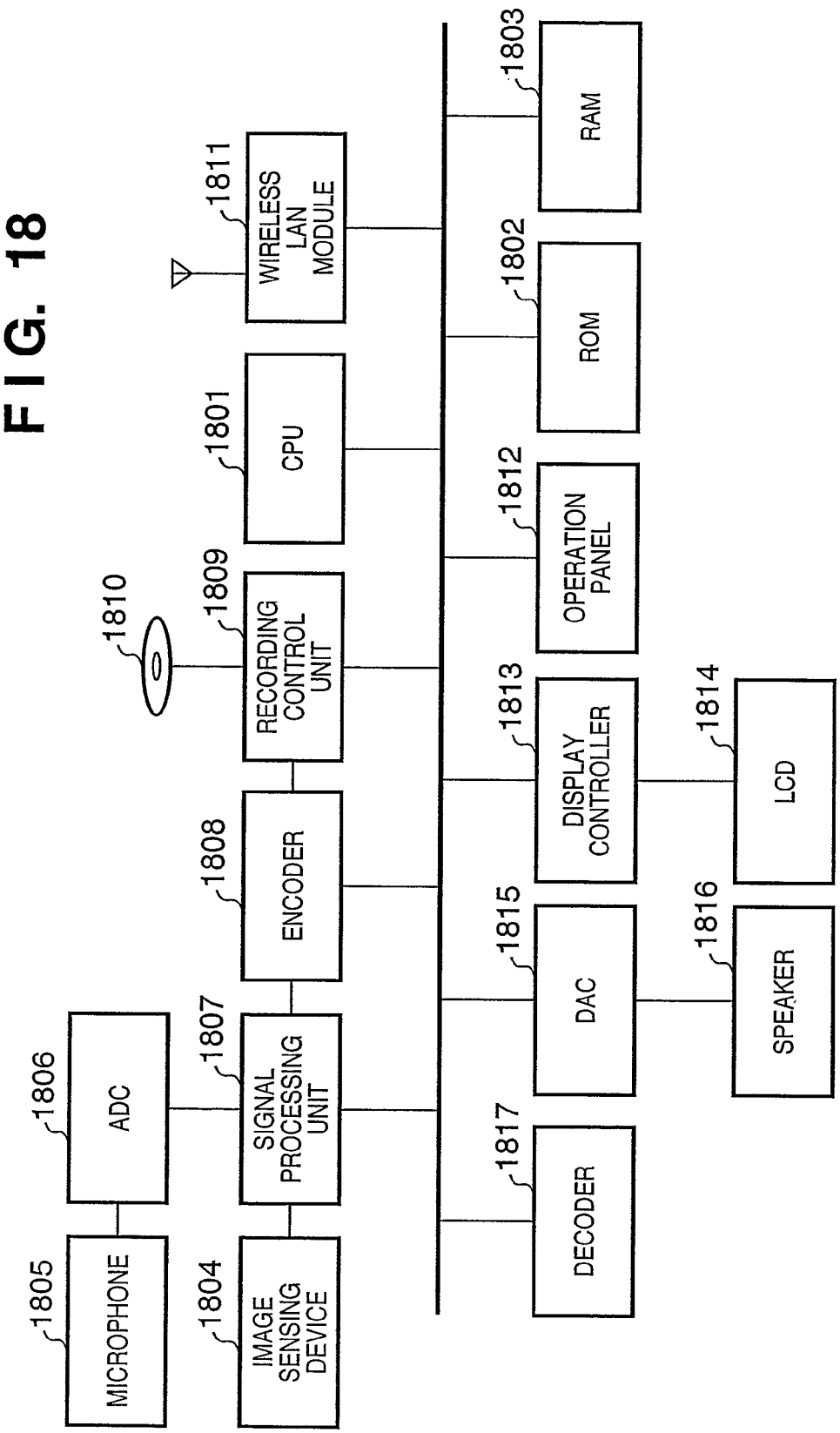
FIG. 18 is a block diagram showing an exemplary internal configuration of a digital video camera 1602.

FIG. 18 is a block diagram showing an exemplary internal configuration of the digital video camera 1602. In FIG. 18, 1801 is a CPU that administers control of the entire digital video camera 1602. 1802 is a ROM that stores the operation programs and various control data of the CPU 1801. 1803 is a RAM that apart from being used as an operation memory of the CPU 1801, is also used as a buffer memory for data transfer performed between the various blocks over buses.

1804 is an image sensing device such as a CDD that converts images imaged by a lens (not shown) into electronic data. 1805 is a microphone for picking up audio, which is then converted into electronic signals through an ADC (Analog Digital Converter) 1806. Prescribed processing is performed on the digitized data by a signal processing unit 1807, after which prescribed encoding such as JPEG, Motion-JPEG, or MPEG2 is performed on the processed data by an encoder 1808. Video data encoded by the encoder 1808 is recorded onto an optical medium 1810 (DVD, etc.) by a recording control unit 1809. 1811 is a wireless LAN module for connecting to other terminal apparatuses through the AP 1601 or by DLS. Video data encoded by the encoder 1808 or read from the optical medium 1810 is transferred to another terminal apparatus via the wireless LAN module 1811.

1814 is a compact LCD display used for confirming shot images and driven by a display controller 1813. Output is performed from the signal processing unit 1807 to the display controller 1813 during shooting. Shooting can thereby be performed while confirming the shot images with the LCD 1814. Playback images of video data recorded on the optical medium 1810 can also be displayed on the LCD 1814.

1817 is a decoder for decoding encoded video data. Video data read from the optical medium 1810 is decoded by a decoder 1817. Decoded playback video is sent to the display controller 1813, and output to the LCD 1814, while decoded playback audio is sent to a DAC 1815 and output to a speaker 1816.

1812 is an operation panel for giving operating instructions to the digital video camera 1602, and is configured from push button switches and the like. Operating instructions for the digital video camera 1602 can be given using the operation panel 1812 and remotely from another terminal apparatus through a wireless LAN.

Processing in which a terminal apparatus acquires the system configuration from the AP 1601, confirms the operating and communication conditions, and creates a usable service list based on these results which is described next using FIGS. 19 and 20.

Figure 19:
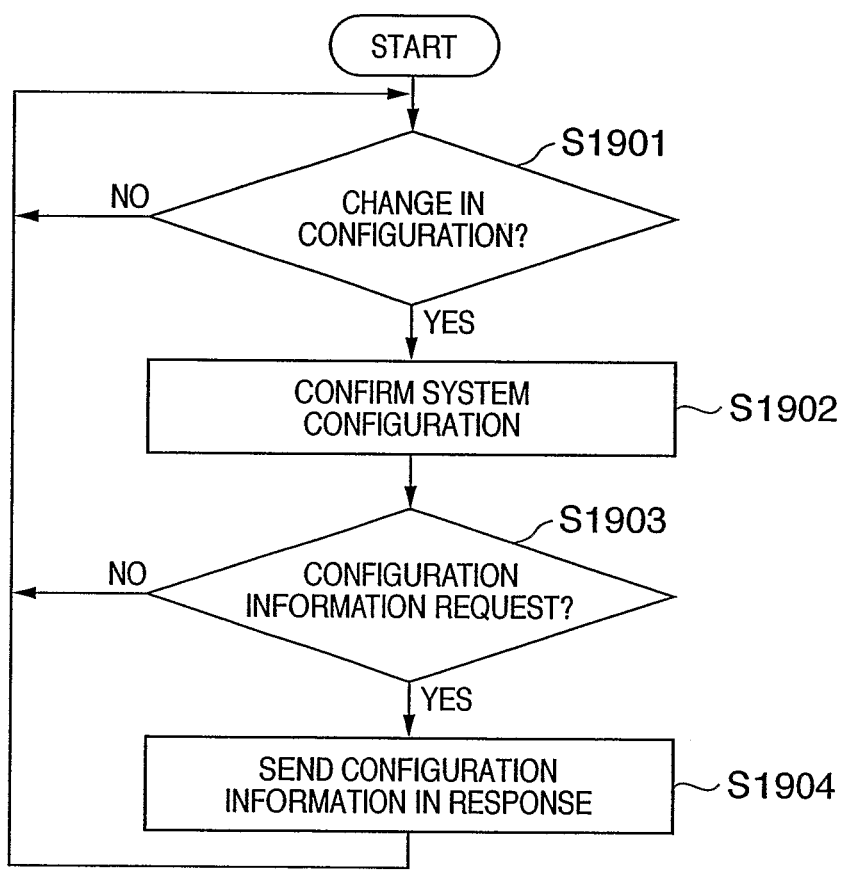
FIG. 19 is a flowchart showing processing by the AP 1601 in the second embodiment.

FIG. 19 is a flowchart showing processing by the AP 1601 of the second embodiment. Firstly, the AP 1601 determines in step S1901 whether there has been a change in the configuration of the wireless LAN. Here, if there has been a change, that is, if a terminal apparatus has associated with or disassociated from the wireless LAN, the processing proceeds to step S1902, where the AP 1601 confirms the system configuration. Specifically, if a terminal apparatus has associated with the wireless LAN, the AP 1601 acquires the device type information of the terminal apparatus and the function information possessed by the apparatus. If a terminal apparatus has disassociated from the wireless LAN, this information is erased. The device type information and function information of associated terminal apparatuses is thereby stored in the RAM 1703 as system configuration information.

Next, in step S1903, the AP 1601 determines whether an acquisition request for system configuration information has been received from any of the terminal apparatus. Here, if there has been an acquisition request, the processing proceeds to step S1904, where the AP 1601 sends the list information stored in the RAM 1703 to the terminal apparatus that made the request.

Here, a difference from the AP 101 of the first embodiment is that the AP 1601 only confirms the system configuration information, and does not confirm the operating or channel condition. In the second embodiment, confirmation of operating and channel conditions and creation of service lists is processing performed by the terminal apparatuses.

Figure 20:
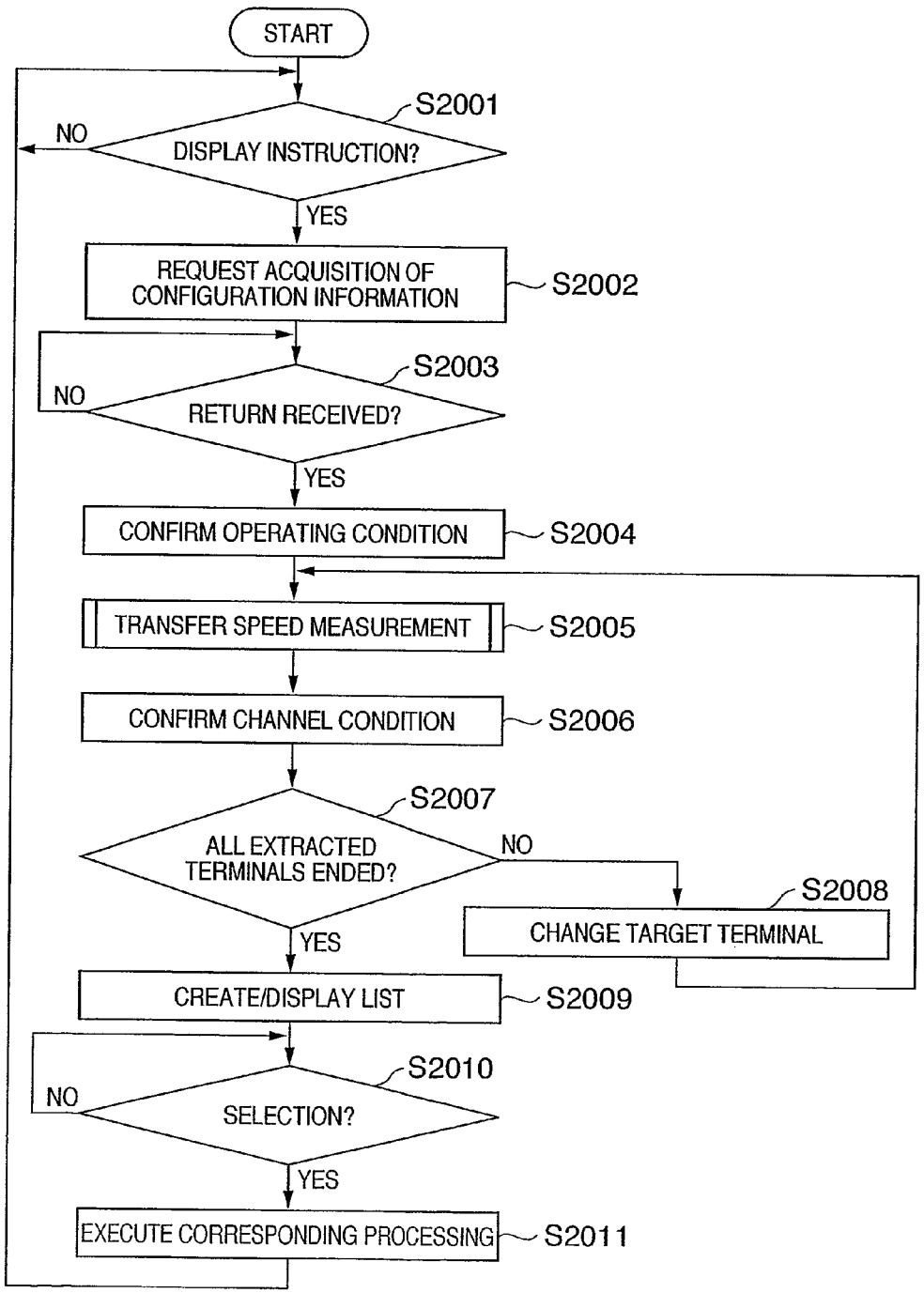
FIG. 20 is a flowchart showing processing by the digital video camera 1602.

FIG. 20 is a flowchart showing processing by the digital video camera 1602. Firstly, in step S2001, the digital video camera 1602 waits for the user to give the instruction to display a service list. Specifically, the digital video camera 1602 waits for the user to give a display instruction using the operation panel 1812. Once a display instruction has been given, the processing proceeds to step S2002, where the digital video camera 1602 transmits an acquisition request for system configuration information to the AP 1601. Next, the digital video camera 1602 waits at step S2003 for a response to the acquisition request; that is, for system configuration information to be sent in response from the AP 1601.

Once the system configuration information has been sent in response, the processing proceeds to step S2004, in which the digital video camera 1602 extracts potential output target terminal apparatuses from the system configuration, confirms the operating condition of all of the extracted terminal apparatuses via wireless LAN, and stores the operating conditions in the RAM 1803. In the example shown in FIG. 16, the display 1603 and the video recording apparatus 1604 are extracted as potential output target terminal apparatuses.

Next, in step S2005, the digital video camera 1602 selects one of the extracted terminal apparatuses, and measures data transfer speed in relation to this terminal apparatus. Note that the detail of the measurement processing is as described using FIG. 9. Then, in step S2006, the digital video camera 1602 confirms the channel condition based on this measured value, and stores this information in the RAM 1803.

Next, in step S2007, the digital video camera 1602 determines whether the data transfer speed has been measured for all of the extracted terminal apparatuses. Here, if measurement has not ended, the processing proceeds to step S2008, in which the digital video camera 1602 changes the targeted terminal apparatus, returns to step S2005, and repeats the above measurement of data transfer speed.

If the measurement of data transfer speed for all of the terminal apparatuses has ended in step S2007, the processing proceeds to step S2009, in which the digital video camera 1602 creates service list information from the system configuration information and the information on operating and channel conditions, and displays the created service list information on the LCD 1814.

Next, the digital video camera 1602 waits at step S2010 for the user to select a desired service from the displayed service list information. Here, once a service is selected, the processing proceeds to step S2011, in which the digital video camera 1602 executes processing that corresponds to the selected service (including remote operations on another terminal apparatus).

FIG. 21 shows an exemplary display of a service list displayed on the LCD 1814 of the digital video camera 1602. As is clear from the figure, the list of service content is displayed together with the executability of the service. If the service is nonexecutable, the reason is displayed in parentheses. Further, "nonexecutable" is set if there is no excess band on the circuit because of other communication even when the terminal apparatus is in standby, resulting in insufficient data transfer speed. In this case, the reason displayed in parentheses is "unable to secure communication band", similarly to the first embodiment.

Note that with a service for transferring still images that does not require QoS control, "nonexecutable" due to insufficient data transfer speed is not displayed because this service is executable provided the terminal apparatus is not operating.

As described in the second embodiment, confirmation of the operating and channel conditions may be executed by a terminal apparatus, rather than needing to be performed exclusively by a wireless access point.

Also, in the case where a terminal apparatus confirms the operating and channel conditions and displays a service list, it is possible to display only services relating to that terminal apparatus.

Other Embodiments

Note that the present invention may be applied in a system configured from a plurality of devices (e.g., host computer, interface device, reader, printer, etc.), or in an apparatus composed of a single device (e.g., copier, facsimile, etc.).

Alternatively, a recording medium storing the program code of software that realizes the functions of the above embodiments may be supplied to a system or an apparatus, and a computer (CPU or MPU) in the system or the apparatus may read and execute the program code stored on the recording medium. Needless to say, the objects of the present invention may also be achieved in this way.

In this case, it is the program code read from the recording medium that realizes the functions of the above embodiments, and the recording medium storing the program code that constitutes the present invention.

In terms of the recording medium for supplying this program code, a flexible disk, a hard disk, an optical disk, a magnetic optical disk, a CD-ROM, a CD-R, a magnetic tape, a nonvolatile memory card, a ROM or the like can be used.

Needless to say, the functions of the above embodiments are not only realized by executing program code read by a computer, with the following case also being included in the present invention. That is, an OS (operating system) or the like running on a computer performs part of all of the actual processing based on instructions in the program code, with the functions of the above embodiments being realized as a result of this processing.

Needless to say, the present invention also includes the case in which program code read from a recording medium is written to a memory provided in a function expansion board inserted in a computer or a function expansion unit connected to a computer. A CPU or the like provided in the function expansion board or the function expansion unit then performs part or all of the actual processing based on instructions in the program code, with the functions of the above embodiment being realized as a result of this processing.

According to the present invention, a list is displayed so as to enable the executability of services using a plurality of terminal apparatuses to be identified, based on the device configuration of a communication system and the operating and channel conditions of the terminal apparatuses. It is thereby possible to realize a communication system offering far superior usability that presents to the user in an easy to understand manner what services are currently available.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage filing of PCT application No. PCT/JP2007/051019 filed on Jan. 17, 2007 which claims priority from Japanese Patent Application No. 2006-023622, filed Jan. 31, 2006, all of which are hereby incorporated by reference herein in their entirety.

The invention claimed is:

1. A communication system in a home network that performs data communication between a plurality of terminal apparatuses by indirect communication via an access point or direct communication, the communication system comprising:
    a device configuration confirmation unit, implemented by a central processing unit, that confirms a device configuration of the communication system, wherein the device configuration is associated with a device information and a function information of the plurality of terminal apparatuses;
    an operating condition confirmation unit, implemented by a central processing unit, that confirms an operating condition of each of the plurality of terminal apparatuses;
    a data transfer speed confirmation unit, implemented by a central processing unit, that confirms an effective data transfer speed between prescribed terminal apparatuses by experimental data transfer, wherein the data transfer speed confirmation unit confirms the data transfer speed of the indirect communication via an access point and the data transfer speed of the direct communication; and
    a service list display unit, implemented by a central processing unit, that identifiably displays, on a display unit, a plurality of services, which are providable by the plurality of terminal apparatuses, in conjunction with information regarding whether each of the services is executable or unexecutable such that a user may select a service before executing the service, based on confirmation results of the device configuration confirmation unit, the operating condition confirmation unit, and the data transfer speed confirmation unit,
    wherein the service list display unit displays, at a first time when there is a lack of data transfer speed of the indirect communication and failure of the direct communication between the plurality of terminal apparatuses, that the service is not executable and displays guidance prompting a change of installation location, and
    wherein the service list display unit displays, at a second time when the direct communication between the plurality of terminal apparatuses succeeds, that the service is executable.

2. The communication system according to claim 1, wherein the service list display unit further displays whether the service is to be executed via an access point or directly between the plurality of terminal apparatuses.

3. The communication system according to claim 1, wherein, if the service is not executable, the service list display unit further displays a cause or a reason for the service not being executable.

4. The communication system according to claim 1, further comprising:
    a service selection unit, implemented by a central processing unit, that causes a service for execution to be selected from a service list displayed by the service list display unit; and
    a service execution control unit, implemented by a central processing unit, that controls execution of the service selected by the service selection unit.

5. A communication apparatus in a home network, the communication apparatus comprising:
    an operating condition confirmation unit, implemented by a central processing unit, that confirms an operating condition of each of a plurality of terminal apparatuses, based on a device configuration of a communication system containing the communication apparatus, wherein the device configuration is associated with a device information and a function information of the plurality of terminal apparatuses;
    a data transfer speed confirmation unit, implemented by a central processing unit, that confirms an effective data transfer speed between prescribed terminal apparatuses by indirect communication via an access point or direct communication by experimental data transfer, based on the device configuration of the communication system containing the communication apparatus, wherein the data transfer speed confirmation unit confirms the data transfer speed of the indirect communication via an access point and the data transfer speed of the direct communication; and
    a display unit, implemented by a central processing unit, that displays a plurality of services, which are providable by the plurality of terminal apparatuses, in conjunction with information regarding whether each of the services is executable or unexecutable such that a user may select a service before executing the service, based on confirmation results of the operating condition confirmation unit and the data transfer speed confirmation unit,
    wherein the service list display unit displays, at a first time when there is a lack of data transfer speed of the indirect communication and failure of the direct communication between the plurality of terminal apparatuses, that the service is not executable and displays guidance prompting a change of installation location, and wherein the service list display unit displays, at a second time when the direct communication between the plurality of terminal apparatuses succeeds, that the service is executable.

6. The communication apparatus according to claim 5, further comprising a device configuration confirmation unit, implemented by a central processing unit, that confirms the device configuration of the communication system.

7. The communication apparatus according to claim 6, wherein the data transfer speed confirmation unit confirms the data transfer speed of the indirect communication and the data transfer speed of the direct communication.

8. The communication apparatus according to claim 6, wherein the display unit transmits information for displaying in another device whether the service is executable.

9. The communication apparatus according to claim 5, further comprising an acquisition unit, implemented by a central processing unit, that acquires the device configuration of the communication system from another communication apparatus.

10. The communication apparatus according to claim 9, wherein the data transfer speed confirmation unit confirms the data transfer speed of the indirect communication via an access point and the data transfer speed of the direct communication.

11. The communication apparatus according to claim 5, wherein the display unit transmits information for displaying in another device whether the service is executable.

12. A display method for a communication system in a home network that performs data communication between a plurality of terminal apparatuses by indirect communication via an access point or direct communication, the display method comprising:

confirming, via a device configuration confirmation unit implemented by a central processing unit, a device configuration of the communication system, wherein the device configuration is associated with a device information and a function information of the plurality of terminal apparatuses;

confirming, via an operating condition confirmation unit implemented by a central processing unit, an operating condition of each of the plurality of terminal apparatuses;

confirming, via a data transfer speed confirmation unit implemented by a central processing unit, an effective data transfer speed between prescribed terminal apparatuses by experimental data transfer, wherein confirming includes confirming the data transfer speed of the indirect communication via an access point and the data transfer speed of the direct communication; and identifiably displaying, via a service list display unit implemented by a central processing unit and on a display unit, a plurality of services, which are providable by the plurality of terminal apparatuses, in conjunction with information regarding whether each of the services is executable or unexecutable such that a user may select a service before executing the service, based on confirmation results of the device configuration confirmation unit, the operating condition confirmation unit, and the data transfer speed confirmation unit, wherein identifiably displaying includes displaying, at a first time when there is a lack of data transfer speed of the indirect communication and failure of the direct communication between the plurality of terminal apparatuses, that the service is not executable and displays guidance prompting a change of installation location, and wherein identifiably displaying includes displaying, at a second time when the direct communication between the plurality of terminal apparatuses succeeds, that the service is executable.

13. A non-transitory computer readable storage medium storing a computer program for causing a computer to execute the display method for a communication system according to claim 12.

* * * * *